US009923943B2

(12) United States Patent
Dickow et al.

(10) Patent No.: US 9,923,943 B2
(45) Date of Patent: Mar. 20, 2018

(54) LOW ENERGY DATA STREAMING SERVICE

(71) Applicant: Myine Electronics, Inc., Ferndale, MI (US)

(72) Inventors: Justin Dickow, Royal Oak, MI (US); Michael Burke, Detroit, MI (US); Scott Smereka, Warren, MI (US); Joel J. Fischer, Royal Oak, MI (US)

(73) Assignee: Livio, Inc., Royal Oak, MI (US)

( * ) Notice: Subject to any disclaimer, the term of this patent is extended or adjusted under 35 U.S.C. 154(b) by 296 days.

(21) Appl. No.: 14/792,033

(22) Filed: Jul. 6, 2015

(65) Prior Publication Data

US 2017/0013033 A1    Jan. 12, 2017

(51) Int. Cl.
*H04L 29/06*     (2006.01)
*H04W 4/00*     (2018.01)
*H04W 4/04*     (2009.01)

(52) U.S. Cl.
CPC ......... *H04L 65/4084* (2013.01); *H04W 4/008* (2013.01); *H04W 4/046* (2013.01)

(58) Field of Classification Search
CPC ........................... H04L 65/4084; H04L 67/16
USPC ....................................................... 709/219
See application file for complete search history.

(56) References Cited

U.S. PATENT DOCUMENTS

| 7,970,927 | B1 | 6/2011 | Shao et al. |
| 8,095,727 | B2 | 1/2012 | Rushworth et al. |
| 2004/0236785 | A1* | 11/2004 | Greiner ................... H04L 29/06 |
| 2012/0117042 | A1* | 5/2012 | Durante ............... G11B 27/105 |
| | | | 707/705 |
| 2014/0348327 | A1 | 11/2014 | Linde et al. |
| 2015/0067787 | A1* | 3/2015 | Stanasolovich ........... G06F 3/00 |
| | | | 726/4 |
| 2015/0319674 | A1* | 11/2015 | Hughes ................. H04W 48/10 |
| | | | 455/41.2 |
| 2016/0173608 | A1* | 6/2016 | Laflen ..................... H04L 67/12 |
| | | | 702/188 |

OTHER PUBLICATIONS

Barry007, Maximum number of characteristics in Bluetooth LE, Jan. 6, 2015, stackoverflow.com (2 pages).*

(Continued)

*Primary Examiner* — Wing F Chan
*Assistant Examiner* — Leon Y Tseng
(74) *Attorney, Agent, or Firm* — Jennifer M. Stec; Brooks Kushman P.C.

(57) ABSTRACT

A service may provide media content metadata describing available media content to reader devices, the service including a zeroth characteristic indicating a count of additional data characteristics of the service and a count of read cycles of the data characteristics to retrieve the metadata. Each of the data characteristics may include an indication of the read cycle of the data characteristic, a data element including a portion of the metadata, and an indication of a data offset of the data element into the media content metadata. Responsive to all subscribed reader devices downloading data from one of the data characteristics, including update data of a next read cycle in the characteristic.

20 Claims, 7 Drawing Sheets

(56) References Cited

OTHER PUBLICATIONS

Stackoverflow.com; "Android: Sending data 20 bytes by BLE," printed Feb. 28, 2015, http://stackoverflow.com/questions/24135682/android-sending-data-20-bytes-by-ble. (6 pages).

Stackovervlow.com, "Sending image file over Bluetooth 4.0 LE," printed Feb. 28, 2015, http://stackoverflow.com/questions/18476335/sending-image-file-over-bluetooth-4-0-le. (4 pages).

Stackoverflow.com, "Read data from BLE device," printed Feb. 28, 2015, http://stackoverflow.com/questions/19928623/read-data-from-ble-device. (4 pages).

Stackoverflow.com, "Android 4.3: How to connect to multiple Bluetooth Low Energy devices," printed Feb. 28, 2015, http://strackoverflow.com/questions/21237093/android-4-3-how-to-connect-to-multiple-bluetooth-low-energy-devices. (6 pages).

"BTLE Transfer/BTLEPeripheralViewController.m," printed Feb. 28, 2015, https://developer.apple.com/library/ios/samplecode/BTLE_Transfer/Listings/BTLE_Transfer_BTLEPeripheralViewController_m.html. (9 pages).

GitHub, dvunwired, "accessory-samples," printed Feb. 28, 2015, https://github.com/devunwired/accessory-samples/blob/master/BluetoothGatt/src/com/example/bluetoothgatt/MainActivity.java. (7 pages).

* cited by examiner

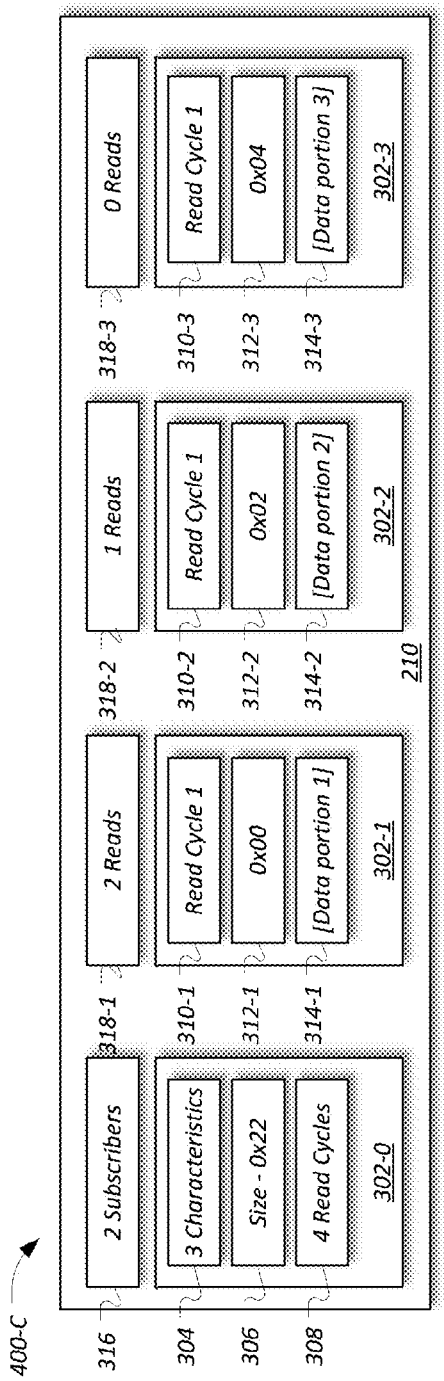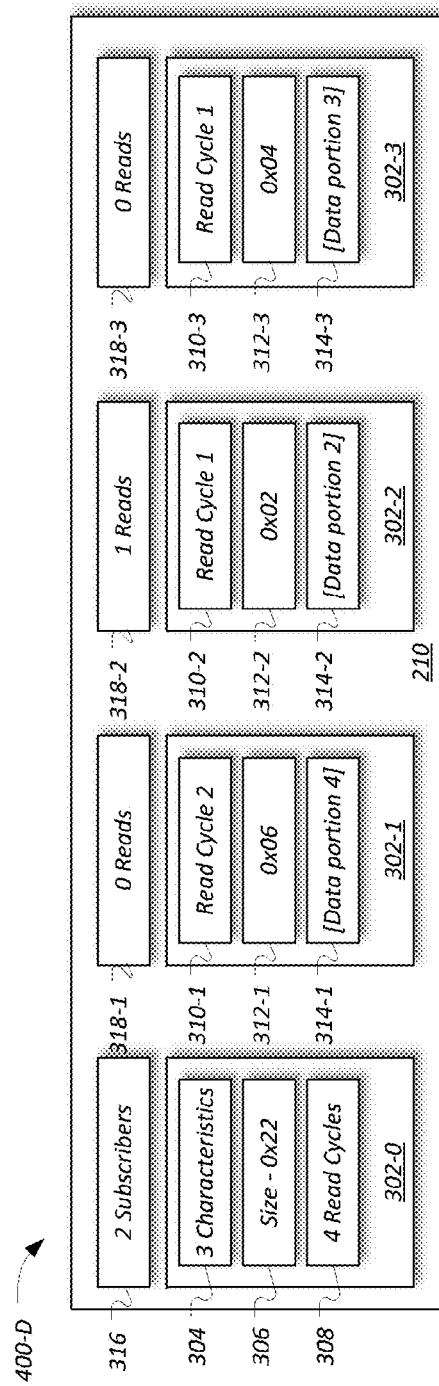

LOW ENERGY DATA STREAMING SERVICE

TECHNICAL FIELD

Aspects of the disclosure generally relate to data streaming services using low-energy data connections between devices.

BACKGROUND

BLUETOOTH technology may be included in various user devices to allow the devices to communicate with one another. BLUETOOTH low energy (BLE) is another wireless technology designed to provide for communication of data between devices. As compared to BLUETOOTH, BLE offers communication of smaller amounts of data but with reduced power consumption.

BLE devices may perform the roles of central device or peripheral device. Central devices wirelessly scan for advertisements by peripheral devices, while peripheral devices make the advertisements. Once the peripheral device connects to the central device, the peripheral device may discontinue the advertisement, such that other central devices may no longer be able to wirelessly identify it or connect to it until the existing connection is terminated.

BLE devices transfer data using concepts referred to as services and characteristics. Services are collections of characteristics. A central device may connect to and access one or more of the characteristics of a service of a peripheral device. Characteristics encapsulate a single value or data type having one or more bytes of data as well as zero or more descriptors that describe the value of the characteristic. The descriptors may include information such as human-readable descriptions, a range for the value of the characteristic, or a unit of measure of the value of the characteristics. A Service Discovery Protocol (SDP) may allow a device to discover services offered by other devices and their associated parameters. The services may be identified by universally unique identifiers (UUIDs).

SUMMARY

In a first illustrative embodiment, a system includes a mobile device configured to advertise a service providing media content metadata to reader devices, the service including a zeroth characteristic indicating a count of data characteristics providing element data and a count of read cycles of the data characteristics to retrieve the metadata; and responsive to all subscribed reader devices downloading a data element from one of the data characteristics, update the data element to a next read cycle.

In a second illustrative embodiment, a first mobile device configured to retrieve, from a zeroth characteristic of a metadata service of a second mobile device, a count of data characteristics of the service and a read cycle count of the data characteristics providing media content metadata descriptive of media content available from the second mobile device; and retrieve the media content metadata from the data characteristics of the second mobile device over the read cycle count.

In a third illustrative embodiment, a computer-implemented method includes advertising a service providing metadata, the service including a zeroth characteristic indicating a count of data characteristics and a count of read cycles of the data characteristics to retrieve the metadata; and including, in each of the data characteristics, an indication of the read cycle of the data characteristic, a data element including a portion of the metadata, and an indication of a data offset of the data element into the metadata.

BRIEF DESCRIPTION OF THE DRAWINGS

FIGS. 4A-4D illustrate examples of operation of the metadata service;

DETAILED DESCRIPTION

Figure 1:
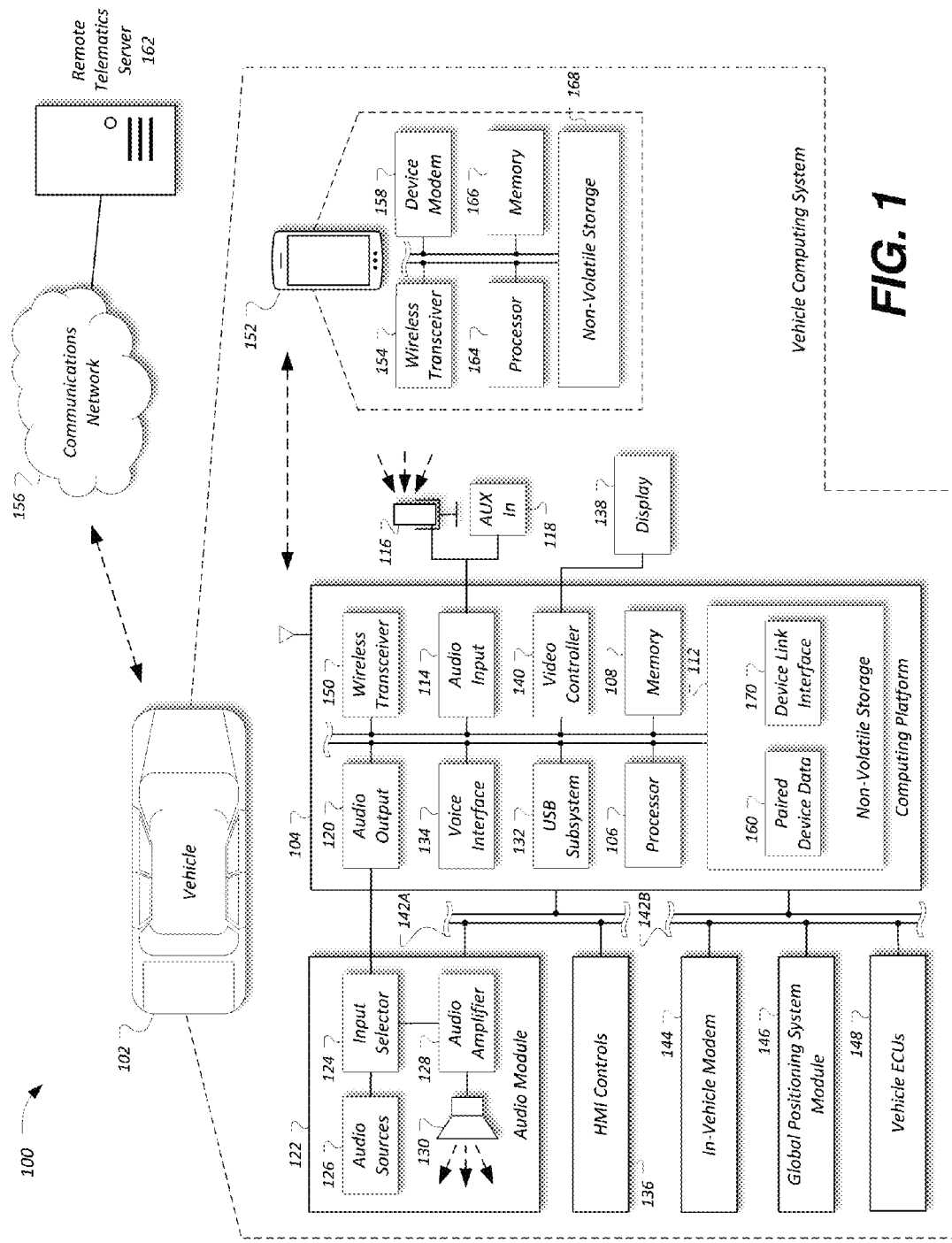
FIG. 1 illustrates an example diagram of a system configured to provide telematics services to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In some brought-in device rear-seat entertainment systems, it may be desirable for the brought-in devices to have a list of available media. However, it may be undesirable for the devices to communicate such information via BLUETOOTH, as doing so may affect BLUETOOTH pairings of other devices with the vehicle.

As another possibility, the devices may communicate over BLE. However, devices connected over BLE may be able to communicate much more limited amounts of data to one another as compared to via WiFi or BLUETOOTH. In an example, due to the limited data size that one BLE characteristic may advertise, the maximum size of an array of metadata items that may be broadcast via BLE may be fewer than ten entries. Such a small amount of data may be insufficient if the metadata list includes a large number of items. Thus, multiple BLE centrals may be interested in the metadata provided by a media metadata service, but the data provided by the service may overflow a single characteristic value.

An improved data transfer implementation may utilize multiple characteristics to provide for transfer of larger elements of data. In an example, a BLE peripheral may advertise a service including multiple characteristics (0 through N). The $0^{th}$ characteristic may include information including the number N of other characteristics 1-N which contain the data, a total length of data that is available for receipt to interested centrals, and a number of 'cycles' of the characteristics needed to obtain all the data. The other characteristics may include a cycle number, a data offset, and data being provided at the cycle number and the data offset.

In such an implementation of a data buffer, all subscribing centrals may use the BLE notify feature on the 1-N characteristics. The notify feature may allow for a read-receipt to be sent back to the peripheral after the central has completed reading the characteristics. The read-receipt may accordingly inform the peripheral how many times its characteristic has been read and by whom.

As a more specific example of a data transfer using the data buffer, the peripheral may advertise four characteristics, i.e., characteristics 0, 1, 2, and 3. A first central and a second central may both read the data of characteristic 1. The first central may complete reading the data of the characteristic 1, may notify the characteristic 1 of receipt of the data, and may begin reading characteristic 2. The second central may then complete reading the data of characteristic 1, and may notify the characteristic 1 of receipt of the data. At this point, the peripheral may update the characteristic 1 to include the data that comes after the end of the data of characteristic 3 (i.e., for the next cycle of reads of the characteristics 1-3).

The peripheral may continue to cycle the data of the characteristics until the centrals have completed their reads. Moreover, the peripheral may notify the centrals using the characteristic 0 if the data has been updated. In some examples, the peripheral may adjust the number of characteristics based on the number of centrals connected. In some examples, the peripheral may also to keep track of whether new devices have connected mid-sequence, and may continue to cycle the data to allow for the late-arriving subscribers to receive all of the data.

Thus, by using the improved data transfer technique, multiple brought-in devices may receive information about media items or other vehicle data using a 'broadcast' (one-to-many) relationship with the subscribing devices, rather than being explicitly paired one-to-one with each device. Further aspects of the data transfer technique are described in detail below.

FIG. 1 illustrates an example diagram of a system 100 configured to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to corporate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142-A, and the vehicle modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

Similar to the computing platform 104, the mobile device 152 may include one or more processors 164 configured to execute instructions of mobile applications loaded to a memory 166 of the mobile device 152 from storage medium 168 of the mobile device 152. In some examples, the mobile applications may be configured to communicate with the computing platform 104 via the wireless transceiver 154 and with the remote telematics server 162 or other network services via the device modem 158. The computing platform 104 may also include a device link interface 170 to facilitate the integration of functionality of the mobile applications into the grammar of commands available via the voice interface 134. The device link interfaced 170 may also provide the mobile applications with access to vehicle information available to the computing platform 104 via the in-vehicle networks 142. An example of a device link interface 170 may be the SYNC APPLINK component of the SYNC system provided by The Ford Motor Company of Dearborn, Mich.

When the mobile device 152 is paired with the computing platform 104 (e.g., via a BLUETOOTH connection), the mobile device 152 may allow the computing platform 104 to use the network connectivity of the device modem 158. Thus may allow the computing platform 104 to communicate over the communications network 156 with the remote telematics server 162 or with other remote computing device. In one example, the computing platform 104 may utilize a data-over-voice plan or data plan of the mobile device 152 to communicate information between the computing platform 104 and the communications network 156. Additionally or alternately, the computing platform 104 may utilize the vehicle modem 144 to communicate information between the computing platform 104 and the communications network 156, without use of the communications facilities of the mobile device 152.

In some cases, the user of the mobile device 152 may desire for the mobile device 152 to communicate with other devices within the vehicle 102. For instance, it may be desirable in a media-sharing system for the mobile device 152 to communicate data stored to the mobile device 152 to other mobile devices 152 within the vehicle 102. To avoid affecting the BLUETOOTH pairing of a mobile device 152 to the computing platform 104, the mobile device 152 may be configured to communicate with the other devices using other protocols, such as BLE. However, devices connected over BLE may be able to communicate much more limited amounts of data to one another as comparted to via WiFi or BLUETOOTH. In an example, due to the limited data size that one BLE characteristic may advertise, the maximum size of an array of metadata items that may be broadcast via BLE may be fewer than ten entries. Such a small amount of data may be insufficient if the amount of data to be shared is large.

Figure 2:
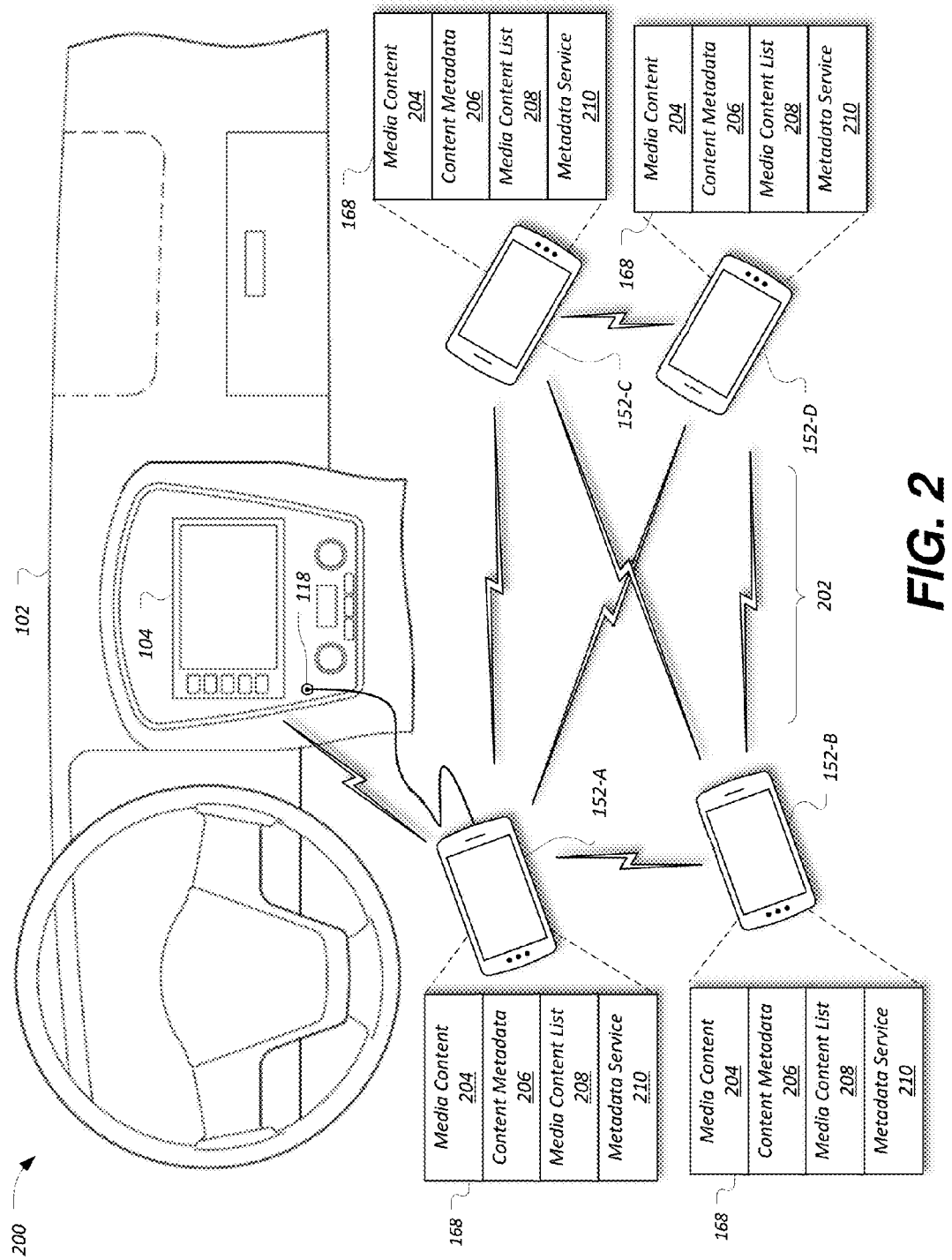
FIG. 2 illustrates an example portion of a vehicle with multiple paired mobile devices.

FIG. 2 is an illustrative example 200 of a portion of a vehicle 102 configured for playing media content 204 from mobile devices 152 via the computing platform 104. As illustrated, the vehicle 102 includes a head unit mounted in a relatively centralized control area between the driver and front passenger seats. The vehicle 102 further includes a plurality of networked mobile devices 152-A through 152-D (collectively 152) connected via data connections 202. The mobile device 152-A is additionally connected to the auxiliary audio input 118 to the computing platform 104, and may accordingly be referred to as the server mobile device 152. It should be noted that this configuration is merely exemplary, and more or fewer mobile devices 152, as well as other vehicle 102 and computing platform 104 layouts may be utilized as well.

Each mobile device 152 may store zero or more instances of media content 204 on one or more memories of the mobile device 152. Media content 204 may include, for example, one or more of audio media content 204 and video media content 204. Audio media content 204 may include downloaded content such as music, as well as content recorded by the mobile device 152, such as live performances or recorded calls or other communications. Video media content 204 may include downloaded content such as television, movies, and commercials, as well as video content recorded by the mobile device 152 such as home movies. The media content 204 may further include or otherwise be associated with media content metadata 206, such as name, artist, title, track number, duration, rating, date recorded and date downloaded, as some non-limiting examples.

The mobile devices 152 may be configured to compile and maintain a combined media content list 208 of all the media content 204 that the mobile devices 152 each store locally. The media content list 208 may include, for example, a collection of the metadata media content 204 from the mobile devices 152, as well as indications of which of the mobile devices 152 store which instances of media content 204. Notably, to build the media content list 208 the server mobile device 152 may utilize the media content metadata 206, so that it would not be required to download the full instances of media content 204 from the other mobile devices 152.

In many cases the server mobile device 152 may be paired to the computing platform 104 via BLUETOOTH. In such an example, it may be difficult for the server mobile device 152 to also pair via BLUETOOTH and communicate with the other mobile devices 152. Moreover, in some cases the mobile devices 152 may either not support other networking technologies such as WiFi, or the mobile devices 152 may wish to avoid the overhead in processing and memory that may be required to use such technologies. To avoid affecting BLUETOOTH pairings of the server mobile device 152, the mobile devices 152 may be configured to communicate with the computing platform 104 and one another using BLE connections 202 to the metadata services 210.

In an example, each of mobile device 152 may provide a metadata service 210 configured to provide media content metadata 206 indicative of the media content 204 available by the respective mobile device 152. The other mobile devices 152 may utilize the metadata services 210 of the other mobile devices 152 to receive the media content metadata 206 from the other mobile devices 152. Using the received information, the mobile devices 152 may accordingly compile the media content list 208 of the media content 204 available within the vehicle 102.

Figure 3:
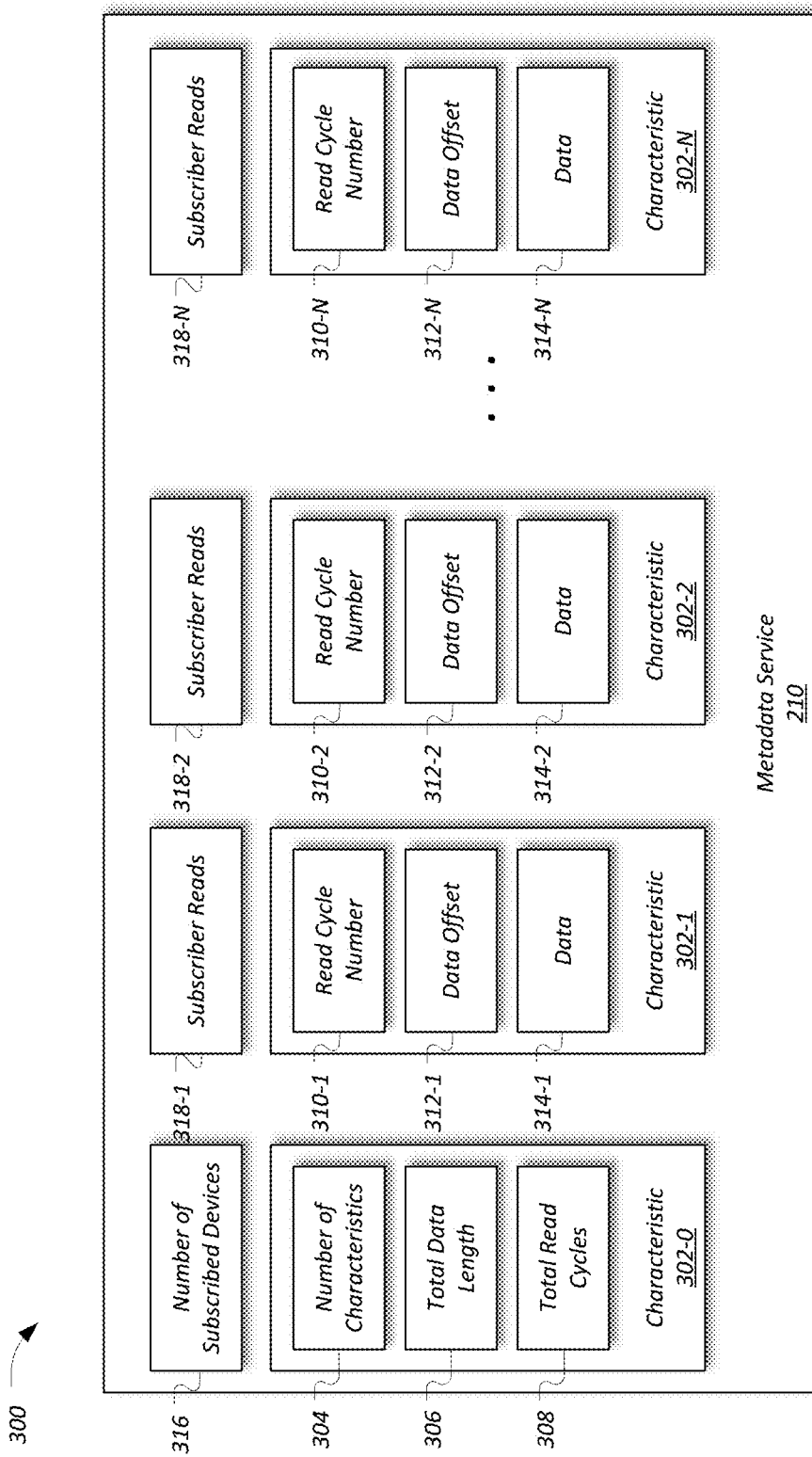
FIG. 3 illustrates an example block diagram of aspects of the metadata service.

FIG. 3 illustrates an example block diagram 300 of aspects of the metadata service 210. As shown, the metadata service 210 may utilize multiple characteristics 302-0 through 302-N to provide for transfer of the media content metadata 206 to subscribers to the metadata service 210. In an example, one of the mobile devices 152 may operate in the role of a BLE peripheral to advertise the metadata service 210, and the other mobile devices 152 may operate in the role of BLE central to connect to and receive the data from the metadata service 210.

The characteristic 302-0 of the metadata service 210 may include information descriptive of the metadata service 210, including metadata descriptive of the number N of other characteristics 304 which contain data element 314, a total data length 306 of the media content metadata 206 that is available for receipt to interested mobile devices 102 (e.g., operating in the role of BLE centrals), and a number of read cycle 308 of the characteristics 302 needed to obtain the media content metadata 206.

The other characteristics 302-1 through 302-N each may include a read cycle number 310 of a data element 314 of the media content metadata 206 being made available by the respective characteristic 302, a data offset 312 of the data element 314 into the media content metadata 206, and data element 314 itself being provided at the read cycle number 310 and the data offset 312 into the media content metadata 206.

The metadata service 210 may also maintain additional information with respect the data transfer. In an example, the metadata service 210 may maintain information indicative of the number of devices 316 that are subscribed to the metadata service 210. Moreover, for each characteristic 302-1 through 302-N the metadata service 210 may maintain information indicative of how many subscriber reads 318 are performed of the respective characteristic 302 (and/or by which mobile devices 152). In an example, the subscribing mobile devices 152 may use the BLE notify feature on the characteristics 302-1 through 302-N, which includes a read-receipt to be sent back to the metadata service 210 once the subscribing mobile device 152 has completed reading the characteristic 302. The read-receipt may accordingly inform the metadata service 210 how many times the corresponding characteristic 302 has been read and/or by which mobile devices 152.

FIGS. 4A-4D each illustrate an example 400 of operation of the metadata service 210. More specifically, each of the examples 400-A through 400-D illustrate a state of the data elements of the metadata service 210 during a transfer of media content metadata 206 by a metadata service 210. In the example 400, the metadata service 210 is configured to advertise four characteristics 302 to two connected mobile devices 152, i.e., characteristics 302-0, 302-1, 302-2, and 302-3.

Figures 4A, 4B:
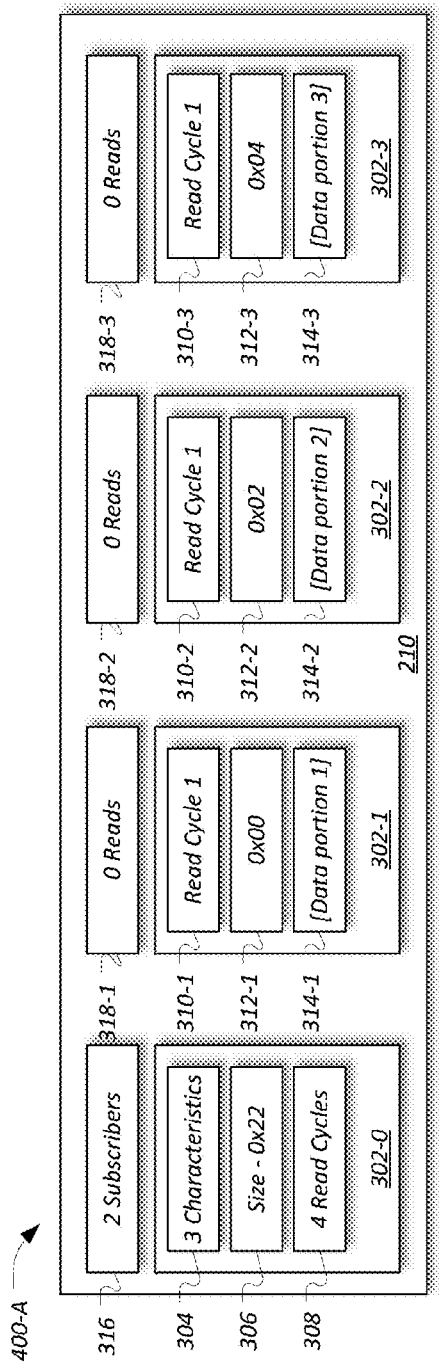

FIG. 4A illustrates an example 400A of operation of the metadata service 210 before any of the media content metadata 206 has been transferred to the connected mobile devices 152. As shown, the characteristic 302-0 includes information that may be read by the connected mobile devices 152 to inform the connected mobile devices 152 of the aspects of the metadata service 210 and the media content metadata 206 to be received. For instance, the number of other characteristics 304 information may indicate that the metadata service 210 exposes three additional characteristics 302 of information, that the media content metadata 206 includes an overall size of 0x22 units, and that retrieving the media content metadata 206 may require four read cycles of the characteristics 302-1 through 302-N (i.e., the three characteristics 302-1 through 302-3 in the illustrated example).

As no data has yet been read, each of the characteristics 302-1, 302-2 and 302-3 may include a read cycle number 310-1, 310-2, 310-3 of the first read cycle, e.g., read cycle 1. Moreover, as the first characteristics 302-1 includes the first data element 314-1 of the media content metadata 206, the data offset 312-1 of the characteristics 302-1 includes an offset value of zero (e.g., 0x00). The characteristic 302-1 may also include a first portion of the media content metadata 206 in the data element 314-1. For sale of explanation, each data portion includes two units of data, e.g., units 0x00 and 0x01 for the characteristic 302-1, although the data element 314 size may vary from metadata service 210 to metadata service 210, or even from characteristic 302 to characteristics 302 within a metadata service 210.

The characteristic 302-2 may include the second portion of the media content metadata 206 in the data element 314-2 (e.g., units 0x02 and 0x03), and may accordingly indicate a data offset 312-2 of 0x02 as the first data element 314-1 is two data units long. Similarly, the characteristic 302-3 may include a third portion of the media content metadata 206 in the data element 314-3, and a data offset 312-3 of 0x04.

As none of the characteristics 302-1, 302-2 and 302-3 have yet been read by the two subscribed mobile devices 152 in the example 400-A, the subscriber reads 318-1, 318-2, and 318-3 are each set to indicate zero reads have been performed.

FIG. 4B illustrates an example 400B of operation of the metadata service 210 after each of the characteristics 302-1 and 302-2 have been read a single time. Such a situation may occur if one of the two subscribed mobile devices 152 reads the characteristics 302-1, notifies the characteristic 302-1 of receipt of the first portion of the media content metadata 206 in the data element 314-1, reads the characteristic 302-2, and notifies the characteristic 302-2 of receipt of the second portion of the media content metadata 206 in the data element 314-2. Or, the situation may occur if one of the two subscribed mobile devices 152 reads the characteristic 302-1 and notifies the characteristic 302-1 of receipt of the first portion of the media content metadata 206 in the data element 314-1, and the other of the subscribed mobile devices 152 read the characteristic 302-2 and notifies the characteristic 302-2 of receipt of the second portion of the media content metadata 206 in the data element 314-2. In either case, the metadata service 210 updates the subscriber reads 318-1 for the characteristic 302-1 to indicate one read notification responsive to the notification to the characteristic 302-1 of receipt of the data element 314-1, and updates the subscriber reads 318-2 for the characteristic 302-2 to indicate one read notification responsive to the notification to the characteristic 302-2 of receipt of the data element 314-2.

FIG. 4C illustrates an example 400C of operation of the metadata service 210 after the characteristics 302-1 has been read two times. Such a situation may occur once both of the subscribed mobile devices 152 have read the characteristics 302-1 and have notified the characteristic 302-1 of receipt of the data element 314-1.

The metadata service 210 may accordingly determine that the number of reads 318-1 of the characteristic 302-1 has reached the total of the number of devices 316 that are subscribed to the metadata service 210 (or that the identifies of all the connected mobile devices 152 have read the characteristic 302-1). Responsive to the determination, as both subscriber mobile devices 152 have received the first data element 314-1 of the media content metadata 206, the metadata service 210 may update the characteristic 302-1 to include a portion of the media content metadata 206 for the second read cycle.

FIG. 4D illustrates an example 400D of operation of the metadata service 210 after the characteristics 302-1 has been updated responsive to determination by the metadata service 210 that the number of reads 318-1 of the characteristic 302-1 has reached the total of the number of devices 316 that are subscribed to the metadata service 210. As shown, the metadata service 210 has updated the read cycle number 310-1 of the characteristic 302-1 to indicate that the information of the characteristic 302-1 now relates to the read cycle 2 of the characteristic 302-1. The metadata service 210 has also updated the data element 314-1 to include the fourth data portion of the media content metadata 206 in the data element 314-1 and the data offset 312-1 to indicate a data offset of 0x06, i.e., after the data portion 3 provided by the read cycle 1 of the characteristic 302-3. Thus, the characteristic 302-1 may now be available for subscribed mobile devices 152 to download data for the next read cycle.

The operation of the metadata service 210 may continue until the media content metadata 206 has been downloaded by the subscribed mobile devices 152. For example, once the subscribed mobile devices 152 have read and notified that the data elements 314-2 and 314-3 of the characteristic 302-2 and 302-3 have been read, the metadata service 210 may similarly update the characteristics 302-2 and 302-3 to include the data portions 5 and 6 of the media content metadata 206, respectively. Similarly, as the data portions of the second cycle are retrieved, the metadata service 210 may update the characteristics 302 to include the data portions of the third cycle. The operation of the metadata service 210 may continue to cycle the characteristics 302 until the entirety of the media content metadata 206 has been transferred to the subscribed mobile devices 152.

In some cases, the metadata service 210 may update the media content metadata 206, for example, responsive to the mobile device 152 hosting the metadata service 210 downloading additional instances of media content 204 to the mobile device 152 or deleting instances of media content 204 from storage of the mobile device 152. In such an example, the metadata service 210 may notify the subscribed mobile devices 152 to indicate the update. For instance, the metadata service 210 may update the information of the characteristic 302-0, such as the total data length 306 and total read cycles 308 to cause the mobile device 152 to identify that the media content metadata 206 has changed. Or, the metadata service 210 may provide an explicit notification to the subscribed mobile devices 152 to indicate the update.

In some cases, the metadata service 210 may determine the number of characteristics 304 used to provide the media content metadata 206 based on the number of subscribed mobile devices 152. As one possibility, the metadata service 210 may set the number-of-characteristics 304 to be equal to the number of subscribed mobile devices 152 or be a predetermined number greater than the number of subscribed mobile devices 152. In another example, the metadata service 210 may set the number-of-characteristics 304 in such a way as to provide for up to a maximum amount of cycles (e.g., to limit the total cycles to five, or ten or twenty, etc.).

In some examples, the metadata service 210 may also to keep track of whether new subscribed mobile devices 152 have connected mid-sequence to a download of the media content metadata 206. If so, the metadata service 210 may identify that, even after completing the cycling of data, the metadata service 210 may recycle back to the initial or earlier data to allow for the late-arriving mobile devices 152 to receive all of the media content metadata 206.

Thus, by using the improved data transfer technique, multiple mobile devices 152 brought into the vehicle 102 may receive media content metadata 206 about available media content 204 or other vehicle data using a 'broadcast' (one-to-many) relationship with the subscribing mobile devices 152, rather than requiring explicit pairing among the mobile devices 152. Each of the mobile devices 152 hosting media content 204 may accordingly also host a metadata service 210 to allow the other mobile devices 152 to determine what media content 204 is available for playback. Using the information retrieved from the metadata services 210, the mobile devices 152 may compile and maintain combined media content lists 208 of all the media content 204 that the mobile devices 152 each store locally.

Figure 5:
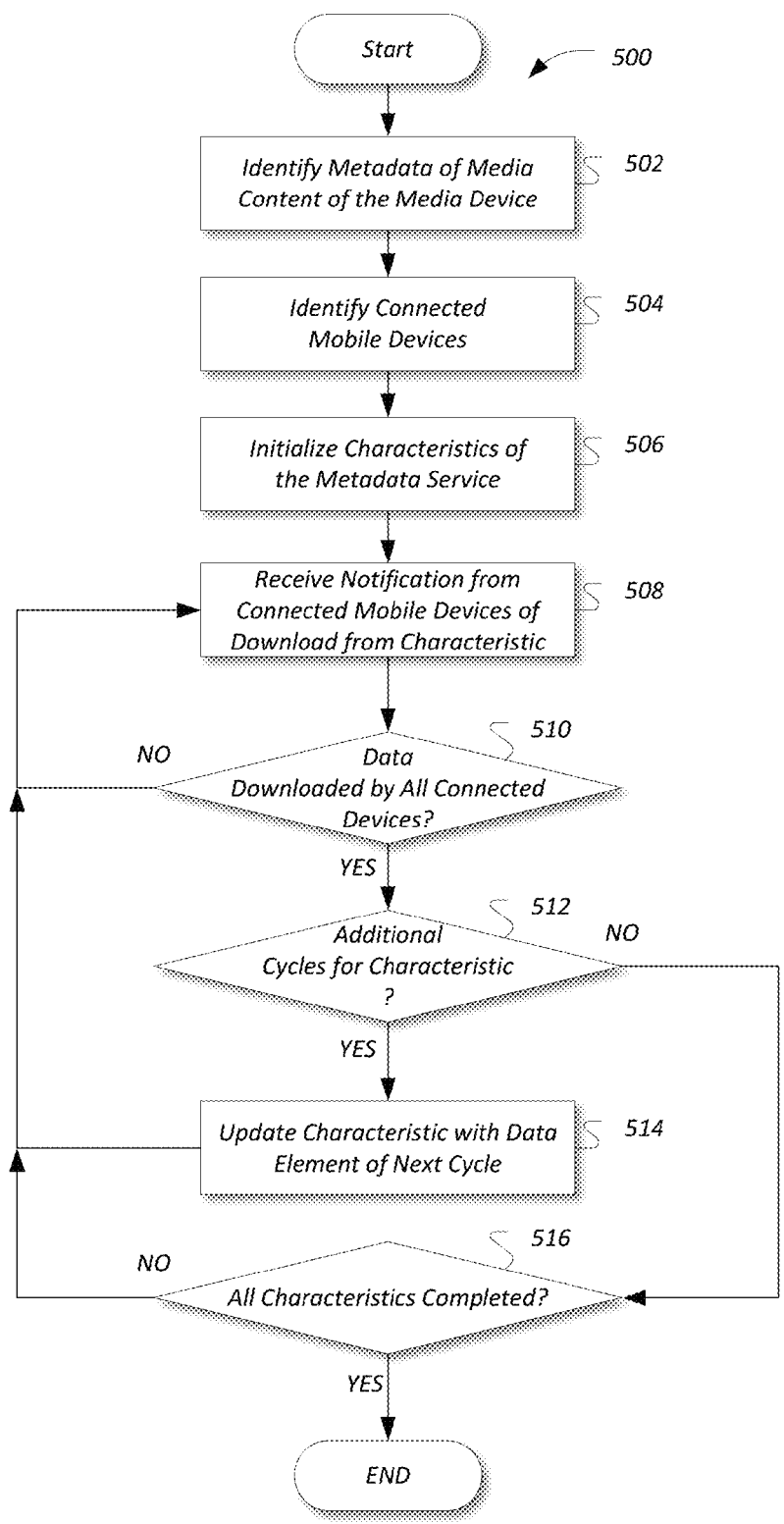
FIG. 5 illustrates an example process of the metadata service providing media content metadata to subscribing mobile devices.

FIG. 5 illustrates an example process 500 of the metadata service 210 providing media content metadata 206 to subscribing mobile devices 152. The process 500 may be performed, in an example, by a mobile device 152 brought into the vehicle 102 and storing one or more instances of media content 204.

At operation 502, the metadata service 210 identifies media content metadata 206 of media content 204 stored to the mobile device 152. In an example, the metadata service 210 may scan a storage medium 168 of the mobile device 152 for a listing of available media content 204. In another example, the metadata service 210 may receive the listing of available media content 204 from one or more media services of the mobile device 152.

At operation 504, the metadata service 210 identifies mobile devices 152. In an example, the metadata service 210 may cause the mobile device 152 to operate as a BLE peripheral to advertise a service including multiple characteristics, and may receive subscriptions from one or more mobile devices 152 operating as BLE centrals that wirelessly scan to look for advertisement of peripheral devices. The metadata service 210 may maintain information indicative of the number of devices 316 that are subscribed to the metadata service 210.

At operation 506, the metadata service 210 initializes the characteristics 302 of the metadata service 210. The characteristic 302-0 of the metadata service 210 may include information descriptive of the metadata service 210, including metadata descriptive of the N number-of-characteristics 304 which contain data element 314, a total data length 306 of the media content metadata 206 that is available for receipt to interested mobile devices 102 (e.g., operating in the role of BLE centrals), and a number of read cycle 308 of the characteristics 302 needed to obtain the media content metadata 206. The other characteristics 302-1 through 302-N each may include a read cycle number 310 of a data element 314 of the media content metadata 206 being made available by the respective characteristic 302, a data offset 312 of the data element 314 into the media content metadata 206, and data element 314 itself being provided at the read cycle number 310 and the data offset 312 into the media content metadata 206.

At operation 508, the metadata service 210 receives a notification from a connected mobile device of a download of a data element 314 of a characteristic 302. In an example, the subscribing mobile devices 152 may use the BLE notify feature on the characteristics 302-1 through 302-N, which includes a read-receipt to be sent back to the metadata service 210 once the subscribing mobile device 152 has completed reading the characteristic 302. The read-receipt may accordingly inform the metadata service 210 how many times the corresponding characteristic 302 has been read and/or by which mobile devices 152.

At operation 510, the metadata service 210 determines whether the data element 314 of the characteristic 302 has been downloaded by all of the connected mobile devices 152. In an example, for each characteristic 302-1 through 302-N the metadata service 210 may maintain information indicative of how many subscriber reads 318 are performed of the respective characteristic 302 (and/or by which mobile devices 152). If the metadata service 210 determines that the number of reads 318 of the characteristic 302 has reached the total of the number of devices 316 that are subscribed to the metadata service 210, control passes to operation 512. Otherwise, control passes to operation 508.

At operation 512, the metadata service 210 determines whether additional cycles of data remain for the characteristic 302. In an example, the metadata service 210 may determine whether the read cycle number 310 of the characteristic 302 has reached the total read cycles 308. If additional cycles are available control passes to operation 514. Otherwise, control passes to operation 516.

At operation 514, the metadata service 210 updates the characteristic 302 with the data element 314 of the next cycle. In an example, the metadata service 210 may update the read cycle number 310 and data element 314 of the characteristic 302 to include the next portion of the media content metadata 206 to be downloaded. After operation 514, control passes to operation 508.

At operation 516, the metadata service 210 determines whether all of the characteristics 302 have no additional cycles of data remaining. In an example, the metadata service 210 may determine whether the read cycle numbers 310 of each of the characteristics 302-1 through 302-N has reached the total read cycles 308. If additional cycles are available for at least one of the characteristics 302-1 through 302-N, control passes to operation 508. In another example, the metadata service 210 may determine whether any mobile devices 152 have connected mid-sequence to the download of the media content metadata 206. If so, the metadata service 210 may again make available earlier cycles that were not yet read by the later-connected devices. Thus, if earlier cycles remain to be again made available for download for at least one of the characteristics 302-1 through 302-N, control may also pass to operation 508. Otherwise, the process 500 ends.

Figure 6:
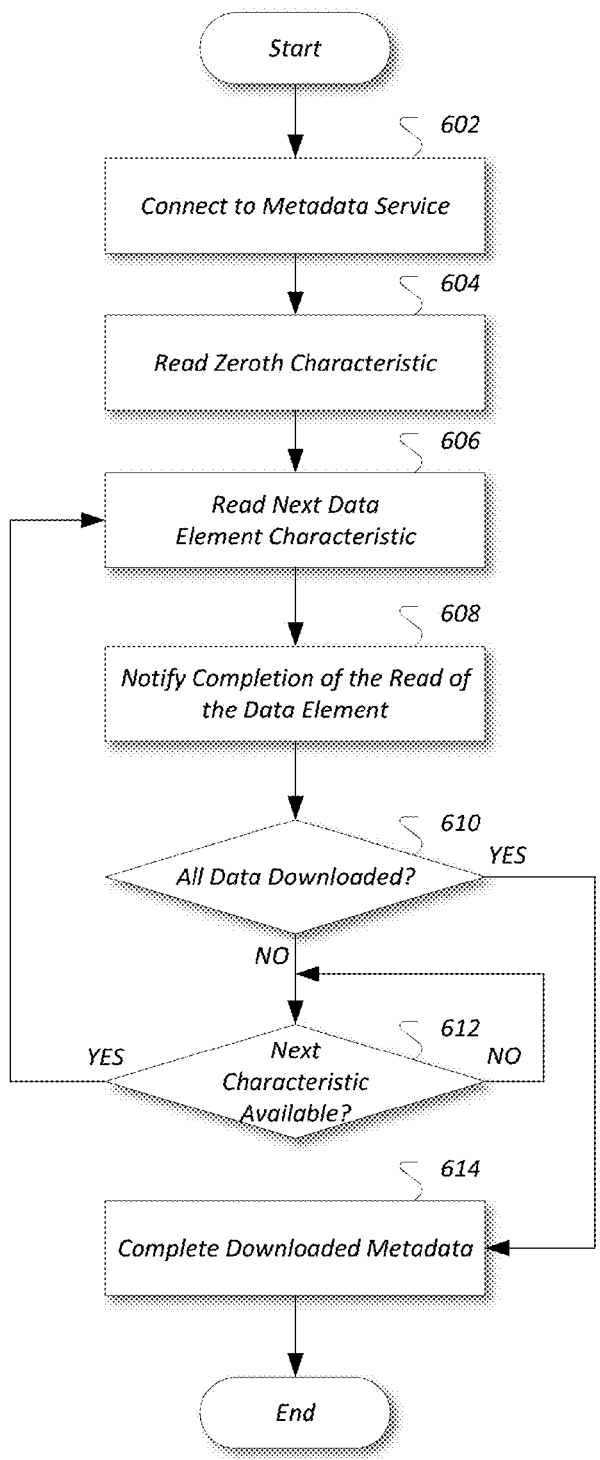
FIG. 6 illustrates an example process of the mobile device retrieving media content metadata from the metadata service.

FIG. 6 illustrates an example process 600 for utilizing metadata services 210 of in-vehicle mobile devices 152 to construct a media content list 208 of available media content 204. In an example, the process 600 may be performed by one of a plurality of mobile devices 152 brought into a vehicle 102.

At operation 602, the subscribing mobile device 152 connects to the metadata service 210 of a mobile device 152 hosting media content 204. In an example, the subscribing mobile device 152 may operate as a BLE central and may subscribe to the hosting mobile device 152 operating as a BLE peripheral to advertise the metadata service 210.

At operation 604, the subscribing mobile device 152 reads the characteristic 302-0 of the metadata service 210 of the hosting mobile device 152. The characteristic 302-0 of the metadata service 210 may inform the subscribing mobile device 152 of the number N number-of-characteristics 304 which contain data element 314, a total data length 306 of the media content metadata 206 that is available for receipt to interested mobile devices 102, and a number of read cycle 308 of the characteristics 302 needed to obtain the media content metadata 206.

At operation 606, the subscribing mobile device 152 reads the next data element 314 of the next characteristic 302-1 through 302-N of the metadata service 210. In an example, the subscribing mobile device 152 may read the read cycle number 310, data offset 312, and data element 314 of the next characteristic 302.

At operation 608, the subscribing mobile device 152 notifies the sending mobile device 152 of completion of the read. In an example, the subscribing mobile devices 152 may use the BLE notify feature on the characteristics 302-1 through 302-N, which includes a read-receipt to be sent back to the metadata service 210 once the subscribing mobile device 152 has completed reading the characteristic 302.

At operation 610, the subscribing mobile device 152 determines whether all of the data has been downloaded. In an example, the subscribing mobile device 152 may determine whether it has received the total data length 306 of the media content metadata 206 that is available for receipt, and/or performed the total number of read cycle 308 of the characteristics 302 to obtain the media content metadata 206. In another example, the subscribing mobile device 152 may be a late-subscribing device to the metadata service 210, and may ensure that the earlier elements of data have been received according to the data offsets 312 and the total data length 306 information. If all of the data has been downloaded, control passes to operation 614. Otherwise control passes to operation 612.

At operation 612, the subscribing mobile device 152 determines whether a next characteristic 302 is available. In an example, the subscribing mobile device 152 may determine whether any of the characteristics 302-1 through 302-N include a data element 314 that the subscribing mobile device 152 had not yet received. If so, control passes to operation 606. If not, control remains at operation 612.

At operation 614, the subscribing mobile device 152 completes the downloaded media content metadata 206. In an example, the subscribing mobile device 152 assembles the media content metadata 206 from the received data in accordance with the data offsets 312 of the retrieved data elements 314. In other examples, the assembly of the media content metadata 206 may be performed incrementally as the data elements 314 are received by the subscribing mobile device 152. After operation 614, the process 600 ends.

Figure 7:
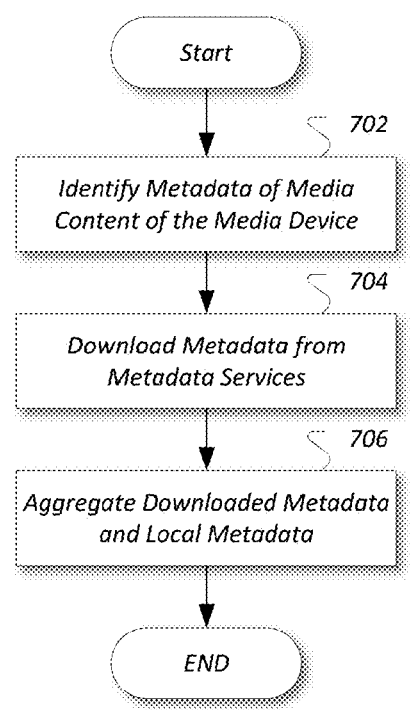
FIG. 7 illustrates an example process of the mobile device compiling the combined media content list using the metadata service.

FIG. 7 illustrates an example process 700 of the mobile device 152 compiling the combined media content list 208 using the metadata service 210.

At operation 702, the mobile device 152 identifies media content metadata 206 of media content 204 of the mobile device 152. In an example, the metadata service 210 may scan a storage medium 168 of the mobile device 152 for a listing of available media content 204. In another example, the metadata service 210 may receive the listing of available media content 204 from one or more media services of the mobile device 152.

At operation 704, the mobile device 152 downloads media content metadata 206 from the metadata services 210. In an example, the mobile device 152 may scan to identify any available metadata services 210 and may download media content metadata 206 from any metadata services 210 that are located. The process 600 described above illustrates an example for downloading media content metadata 206 from a metadata service 210.

At operation 706, the mobile device 152 aggregates the downloaded media content metadata 206 and the local media content metadata 206 to create a combined media content list 208. After operation 706, the process 700 ends.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A mobile device comprising:
memory; and
a processor programmed to
advertise a service providing media content metadata to reader devices, the service including a zeroth characteristic indicating a count of data characteristics providing element data and a count of read cycles of the data characteristics to retrieve the metadata, wherein the count of data characteristics is set based on a count of the reader devices subscribed to the service; and
responsive to all subscribed reader devices downloading a data element from one of the data characteristics, update the data element to a next read cycle.

2. The mobile device of claim 1, wherein each of the data characteristics includes an indication of the read cycle of the data characteristic, a data element including a portion of the metadata, and an indication of a data offset of the data element into the media content metadata.

3. The mobile device of claim 2, wherein the processor is further programmed to receive a read-receipt for a data characteristic from one of the reader devices indicating that the reader device has completed reading the data element including a portion of the metadata from the data characteristic.

4. The mobile device of claim 1, wherein the processor is further programmed to update the count of data characteristics based on identification of a change in a count of the reader devices subscribed to the service.

5. The mobile device of claim 1, wherein the processor is further programmed to set the count of data characteristics based on a length of the metadata.

6. The mobile device of claim 1, wherein the processor is further programmed to, responsive to all the subscribed reader devices downloading the data element as updated from the one of the data characteristics, include an additionally-updated data element of a next read cycle in the one of the data characteristics.

7. A mobile device comprising:
a memory; and
a processor programmed to
retrieve, from a zeroth characteristic of a metadata service of a second mobile device, a count of data characteristics of the service and a read cycle count of the data characteristics providing media content metadata descriptive of media content available from the second mobile device, wherein the count of data characteristics is set based on a count of reader devices subscribed to the metadata service; and
retrieve the media content metadata from the data characteristics of the second mobile device over the read cycle count.

8. The mobile device of claim 7, wherein the processor is further programmed to request the second mobile device to play an instance of media content listed in the media content metadata.

9. The mobile device of claim 7, wherein the processor of the mobile device is further programmed to:
  identify local media content metadata descriptive of media content stored to the mobile device; and
  construct a combined media content list including the media content metadata descriptive of media content available from the second mobile device and the local media content metadata descriptive of media content stored to the mobile device.

10. The mobile device of claim 7, wherein the mobile device and the second mobile device are smartphones.

11. The mobile device of claim 7, wherein each of the data characteristics includes an indication of the read cycle of the data characteristic, a data element including a portion of the metadata, and an indication of a data offset of the data element into the media content metadata.

12. The mobile device of claim 11, wherein the processor is further programmed to:
  download the data element from one of the data characteristics;
  notify the one of the data characteristics of the download of the data element; and
  when the indication of the read cycle of the data characteristic indicates that the data element is updated to a next read cycle, download the data element as updated.

13. The mobile device of claim 11, wherein the processor is further programmed to assemble the data elements into the media content metadata ordered according to the data offset of each of the data characteristics.

14. A computer-implemented method comprising:
  advertising a service providing metadata, the service including a zeroth characteristic indicating a count of data characteristics and a read cycles count of the data characteristics to retrieve the metadata, wherein the count of data characteristics is set based on a count of reader devices subscribed to the service; and
  including, in each of the data characteristics, an indication of the read cycle of the data characteristic, a data element including a portion of the metadata, and an indication of a data offset of the data element into the metadata.

15. The method of claim 14, further comprising, responsive to all subscribed reader devices downloading a data element from one of the data characteristics, updating the data element to a next read cycle.

16. The method of claim 15, further comprising:
  receiving a request from one of the subscribed reader devices to play an instance of media content listed in the metadata; and
  playing the instance of media content responsive to the request.

17. The method of claim 15, further comprising receiving a read-receipt for a data characteristic from one of the reader devices indicating that that the reader device has completed reading the data element from the data characteristic.

18. The method of claim 14, further comprising updating the count of data characteristics based on identification of a change in the count of reader devices.

19. The method of claim 14, further comprising, responsive to all subscribed reader devices downloading the data element as updated from the one of the data characteristics, including an additionally-updated data element of a next read cycle in the one of the data characteristics.

20. A method comprising:
  advertising a metadata service including a zeroth characteristic indicating a count of data characteristics providing element data and a count of read cycles of the data characteristics to retrieve metadata;
  setting the count of data characteristics per a count of reader devices subscribed to the service; and
  responsive to all subscribed reader devices downloading a data element from one of the data characteristics, updating the data element to a next read cycle.

\* \* \* \* \*